Feb. 4, 1964     O. C. NORTON     3,120,239
AUTOMATIC DRAIN VALVE
Filed March 24, 1961
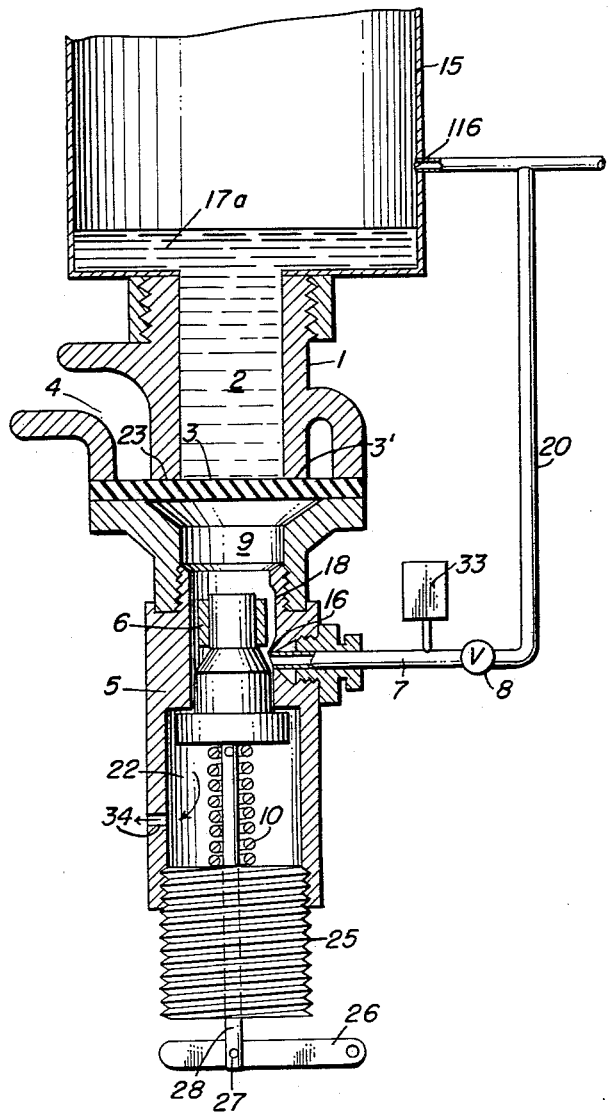
INVENTOR
ORLO CLAIR NORTON
BY
ATTORNEY United States Patent Office 3,120,239
Patented Feb. 4, 1964

3,120,239
AUTOMATIC DRAIN VALVE
Orlo Clair Norton, 544 Virginia Ave., Erie, Pa.
Filed Mar. 24, 1961, Ser. No. 98,166
2 Claims. (Cl. 137—204)

This invention relates to valves and, more particularly, to the type of valve suitable for intermittent automatic operation.

It is important that the accumulation of solution in deliquescent type air driers be drained periodically. This requires the time of personnel and is sometimes overlooked to the detriment of the operation of the drier. A practical automatic drain valve would solve this problem.

The valve disclosed herein has been found suitable and it will remain closed for a predetermined time, then will open briefly for a predetermined time to release the solution, and then will reclose. The valve consists of a body having a diaphragm stretched across it and the diaphragm is held closed normally by air from an air source. As the air from the source builds up beyond a predetermined pressure, it will actuate a relief valve which will relieve the pressure above the diaphragm and allow the diaphragm to open for a short period of time, thereby draining the valve. This structure is particularly suitable for draining the solution from the sump of deliquescent type air driers wherein the deliquescent material in solution accumulates at the bottom of the air drier and must be drained periodically. If it is not drained, it may interfere with the operation of the device.

It is, accordingly, an object of the present invention to provide an improved intermittent operating valve.

Another object of the invention is to provide a new combination of air drier and drain valve therefor.

A further object of the invention is to provide a valve which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The FIGURE of drawing is a cross sectional view of a valve and air drier combination according to the invention.

Now with more specific reference to the drawing, the valve shown consists of a body 1 having a passage 2 connected to an air drier tank 15. The air drier tank 15 has an inlet 116 from a suitable source of compressed air and it will have a suitable bed of hygroscopic chemical (not shown) through which the air may pass. As the air passes over the chemical, the moisture from the air will form a solution with the chemical and collect at 17a in the sump at the bottom of the tank. This will accumulate and it will be drained off by the valve at predetermined times, the frequency of which depends upon the setting of a throttle valve 8.

The body 1 has a passage 2 therethrough which is closed by a flexible diaphragm 3. The diaphragm 3 may be made of rubber, synthetic plastic, or other suitable thin flexible material. The passage 2 communicates past a seat 3′ with a passage 4 which, in turn, connects to the atmosphere. The passage 4 could be connected to a suitable drainage pipe. A poppet valve 5 connects a pipe 7 through a passage 18 to a chamber 9. Air flows from an inlet pipe 20 at a controlled rate through the throttle valve 8 and the pipe 7 through the passage 18 into the chamber 9. The air flows at a rate depending upon the setting of the throttle valve 8.

As pressure builds up in the chamber 9, the diaphragm 3 is forced into sealing relation with the seat 3′ and thus closes the passage from the passage 2 to the passage 4. As the pressure continues to rise in the chamber 9, it overcomes the force of a spring 10 and causes the poppet valve 5 to be forced open against the force of the spring 10. This pressure will overcome the force of the spring 10 and will move the poppet valve 5 up and a sleeve 6 attached thereto will move over the inlet 16, closing the pipe 7 and allowing the air in the chamber 9 to escape into a chamber 22 and out an orifice 34. This will allow the diaphragm 3 to move off of its seat 23 and allow the fluid to flow from the passage 2 out through the passage 4.

When the air pressure in the chamber 9 has been thus exhausted, the spring 10 will push the poppet valve 5 again to closed position, closing the chamber 9 and opening the sleeve 6 so that air pressure can again build up in the chamber 9. The build up of pressure in the chamber 9 is accelerated by air from a surge tank 33. This pressure will close the diaphragm 3 and hold it in closed position until the pressure in the chamber 9 has again built up to a value sufficient to overcome the force of the spring 10. The chamber around a rod 28 is vented at 34.

A piston may be used in place of the diaphragm. The cycle of time of opening of the poppet valve 5 can be regulated by opening or closing the valve 8 and, also, by varying the tension on the spring 10 by adjusting a plug 25 inward or outward.

The valve is so constructed that if, for any reason, the spring 10 should fail, the valve will immediately move to open position.

A handle 26 is pivotally attached at 27 to the rod 28 and, by rotating the handle 26, the poppet valve 5 can be opened manually to drain the sump. In case the diaphragm 3 ruptures or fails, the valve will fall in the open position so that the solution 17a can escape. This is a safety feature of the valve.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, an air drier tank and a drain valve, said drain valve comprising an elongated hollow body having an outlet at one side thereof, a partition between said tank and said outlet, said partition being defined by a seat surrounding said hollow in said body, a diaphragm stretched across said hollow in said body and adapted to be forced into sealing engagement with said seat, a chamber on the side of said diaphragm opposite said tank with said diaphragm forming one side of said chamber, a poppet valve forming a closure for said chamber, said poppet valve having a sleeve thereon, an air line connected from the inside of said tank to said body and being selectively connected to said chamber by said poppet valve, said poppet valve being movable to open said chamber to the atmoshere, and a spring urging said poppet valve to close the opening to the atmosphere and to open a passage from said air line to said chamber, said poppet valve being movable by pressure in said chamber to open said connection to the atmosphere, said sleeve cooperating with said air line to close the connection between said air line and said chamber when said poppet valve opens communication between said air line and the atmosphere whereby the pressure in said chamber escapes, allowing said diaphragm to move out of engagement with said seat and connect the inside of said tank to the atmosphere.

2. A valve comprising a body having an inlet and an outlet to the outside of said body, a passage in said body, a chamber in said body opposed to said passage, a diaphragm in said body between said passage and said chamber, an opening from said passage to said outlet, a poppet valve forming a closure for said chamber, means on said body connecting said chamber to a space outside said body when said poppet valve is open, means urging said poppet valve to closed position, and a reference source of gas under pressure connected to said chamber, said diaphragm engaging said body around said opening closing said opening from said passage to said space outside said body when the pressure in said chamber is above a first predetermined value and below a value sufficient to overbalance said means urging said poppet valve closed, said diaphragm being held closed against said body around said opening by pressure in said chamber during the time pressure in said chamber is increasing due to gas entering said chamber from said reference source, said diaphragm moving from the part of said body defining said opening when said pressure in said chamber overbalances said means urging said poppet valve closed whereby said pressure in said chamber is reduced substantially to atmospheric pressure for a finite time and the pressure in said passage exceeds atmospheric pressure.

References Cited in the file of this patent

UNITED STATES PATENTS

| | | |
|---|---|---|
| 2,007,554 | Westerberg | July 9, 1935 |
| 2,345,379 | Campbell | Mar. 28, 1944 |
| 2,877,978 | Rider | Mar. 17, 1959 |